United States Patent
Ives

(10) Patent No.: US 6,644,408 B2
(45) Date of Patent: Nov. 11, 2003

(54) EQUALIZING FLAPPER FOR DOWN HOLE SAFETY VALVES

(75) Inventor: Jason B. Ives, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 41 days.

(21) Appl. No.: 10/010,692

(22) Filed: Dec. 5, 2001

(65) Prior Publication Data

US 2002/0084076 A1 Jul. 4, 2002

Related U.S. Application Data

(60) Provisional application No. 60/251,224, filed on Dec. 5, 2000.

(51) Int. Cl.[7] ................................................. E21B 34/14

(52) U.S. Cl. .................................................. 166/332.7

(58) Field of Search ................................ 166/325, 386, 166/321, 324, 332.7, 332.8

(56) References Cited

U.S. PATENT DOCUMENTS

| 3,078,923 | A |   | 2/1963  | Tausch |
| 4,415,036 | A |   | 11/1983 | Carmody et al. |
| 4,475,599 | A |   | 10/1984 | Akkerman |
| 4,478,286 | A |   | 10/1984 | Finberg |
| 6,079,497 | A |   | 6/2000  | Johnston et al. |
| 6,087,036 | A | * | 7/2000  | Rouillard et al. ............. 429/66 |
| 6,254,532 | B1 | * | 7/2001 | Paolitto et al. ............. 600/201 |
| 6,296,061 | B1 | * | 10/2001 | Leismer ...................... 166/386 |

FOREIGN PATENT DOCUMENTS

| GB | 2343208      | 5/2000 |
| GB | 2345076      | 6/2000 |
| WO | WO 98/557732 | 12/1998 |

* cited by examiner

*Primary Examiner*—William Neuder
(74) *Attorney, Agent, or Firm*—Steve Rosenblatt

(57) ABSTRACT

An equalizer valve for a flapper in a subsurface safety valve is described. A tapered plunger is biased by compact spring disposed in the plunger bore. The spring is supported by a C-shaped ring extending into a peripheral groove around the plunger bore.

20 Claims, 4 Drawing Sheets

EQUALIZING FLAPPER FOR DOWN HOLE SAFETY VALVES

This application claims benefit of Prov. No. 60/251,224 filed Dec. 5, 2000.

FIELD OF THE INVENTION

The field of this invention related to equalizing valves mounted in ninety degree rotatable closure members, known as flappers, and more particularly to biasing systems to keep such equalizing valves in a closed position.

BACKGROUND OF THE INVENTION

Typically, a well completion includes a sub-surface safety valve. This valve is actuated from the surface using a hydraulic control system with control lines running from the surface to the valve location. These valves feature a closure member which is rotatable through an arc of ninety degrees. The control system pressure is used to move a hollow tube, known as a flow tube, downwardly, usually against a return spring. The downward movement of the flow tube rotates the flapper downwardly and out of the way to allow flow from the producing formation to reach the surface through the flow tube. Removal of pressure from the control system allowed the return spring to bias the flow tube upward, whereupon another spring on the flapper urged it to the closed position, blocking the opening in the flow tube.

With the flapper in the closed position, formation pressure builds up on the closed flapper. In this intended mode of operation, the flapper holds back the flow from the formation in order to allow for safe well operation. The problem that arises occurs when the well needs to be placed in service at a later time. The flapper must then be opened. However, at this time there may be substantial differential pressure acting on substantially the entire cross-sectional area of the flapper. Aggravating this differential pressure problem would be a situation in the well bore above the closed flapper where thousands of feet of the tubing was gas filled or filled with a light density fluid. The presence of gas or light weight fluids above the flapper had, in the past, required that such fluids be replaced with heavier fluid to eliminate or reduce differential pressure across the flapper prior to actuation of the flow tube. The fluid replacement procedure was costly as well as time consuming and better methods were developed to expedite the re-opening of the flapper under conditions of high differential pressure.

The equalizing valve in the flapper design was developed to addressed this issue. This prior art design is illustrated in FIG. 1. A flapper 10 is shown in perspective with a vertical segment 12 machined out adjacent an edge 14. Undercuts 16 and 18 straddle the vertical segment 12 to allow for placement of a leaf spring 20 therein. Leaf spring 20 straddles bore 22 in which is disposed a plunger 24. Plunger 24 has a taper 26 which is biased against a mating edge or surface in bore 22. The plunger 24 is situated so that a flow tube(not shown), when urged downwardly by a control system will first contact plunger 24 and move it against the bias of leaf spring 20. Thus, before the flapper 10 begins to move, the taper 26 has come off of its mating edge or surface in the bore 22 to equalize pressure on the flapper 10. Those skilled in the art will appreciate that the view in FIG. 1 illustrates the down hole side of the flapper and that the flow tube is positioned on the opposite side of the flapper from which location it can make initial contact with the extending plunger 24.

There was a weakness in the design described above which, in some cases, resulted in leakage past taper 26 and its mating surface in bore 22. The reason this happened is directly related to the amount of the flapper 10 that had to be machined away to form the removed vertical segment 12 and its adjacent undercuts 16 and 18. The removal of so much metal to accommodate the leaf spring 20 weakened the flapper 10 sufficiently to allow distortion of bore 22 with resulting leakage past taper 26.

Accordingly, the objective of the present invention is to improve the design of the prior art FIG. 1 so as to eliminate the leakage problem under conditions of high differential pressure across the flapper 10. This and other advantages will become apparent to those skilled in the art from a review of the preferred embodiment, described below.

Relevant to the present invention are U.S. Pat. Nos. 6,079,947; 5,884,705; 5,503,229; and 5,752,569.

SUMMARY OF THE INVENTION

An equalizer valve for a flapper in a subsurface safety valve is described. A tapered plunger is biased by compact spring disposed in the plunger bore. The spring is supported by a retaining ring which may be a C-shaped ring extending into a peripheral groove around the plunger bore.

DETAILED DESCRIPTION OF THE PREFERRED EMBODIMENT

Figure 3:
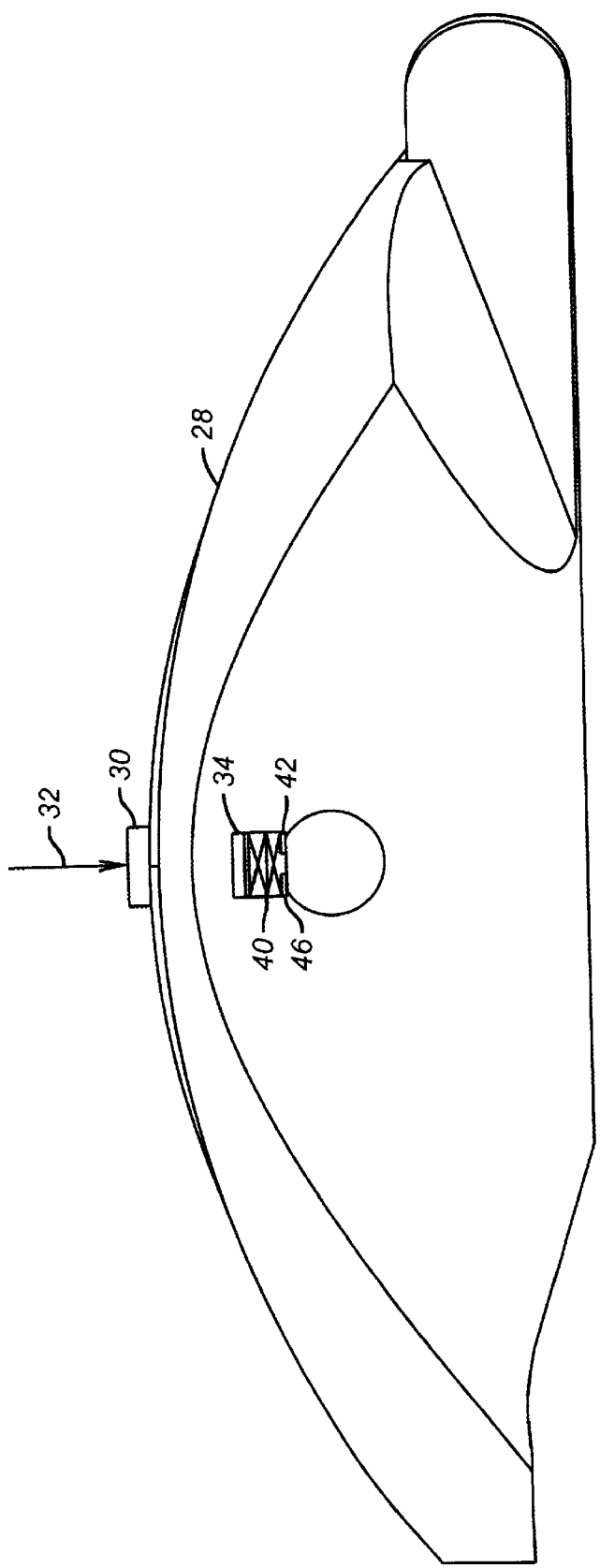
FIG. 3 is an elevational view of the equalizer valve of the present invention.

Referring to FIG. 3, the flapper 28 is shown to best illustrate the extension of the plunger 30 so as to position it for selective contact with a downwardly moving flow tube, schematically represented by arrow 32. Plunger 30 resides in bore 34, which is preferably narrow. Bore 34 has a mill flat 36, best seen in FIG. 4. The plunger 30 has a mating taper 38 which makes sealing contact with mill flat 36. Other configurations for sealing apart from mill flat 36 and taper 38 can be used without departing from the invention. For example, sealing can be metal to metal at an end of plunger 30. Alternatively the sealing can involve a resilient seal or seals or could involve metal to metal contact at other locations of plunger 30.

A bias onplunger 30 is provided by a spring 40 which is retained in bore 34 by a retainer such as c-ring 42. In the preferred embodiment the spring 42 is a wave spring. This type of spring is preferred because it provides a relatively large closing force when longitudinally compressed a short distance as compared with, for example, a coiled spring. Wave springs are available from Smalley Steel Company of Wheeling, Ill. They feature the ability to fit in small spaces and yet to provide the requisite force. In the case of a flapper 28 there is a limited space available dictated by the thickness near edge 44 where contact with the flow tube (represented by arrow 32) has to occur.

Figure 1:
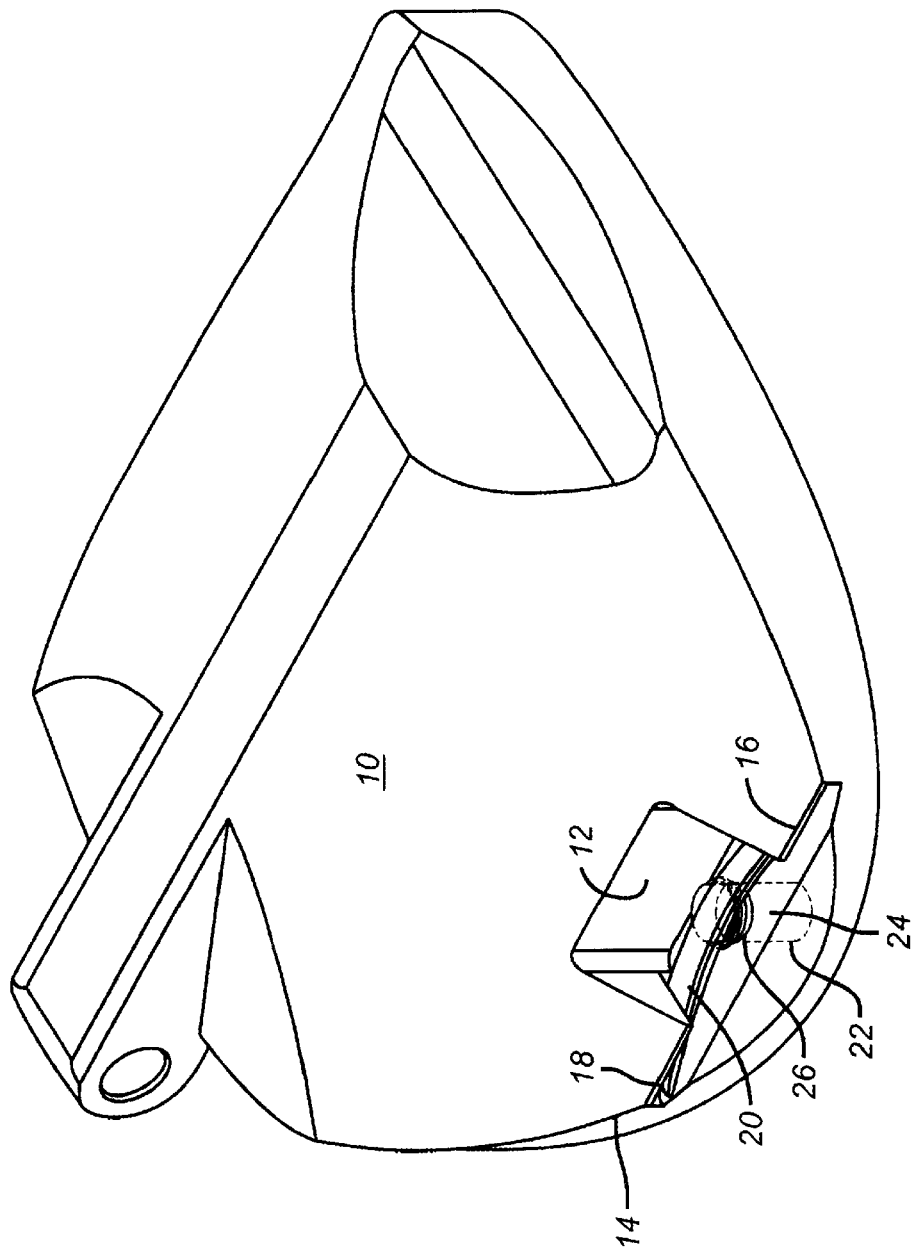
FIG. 1 is a perspective view of a prior art equalizer design for a flapper.
Figure 2:
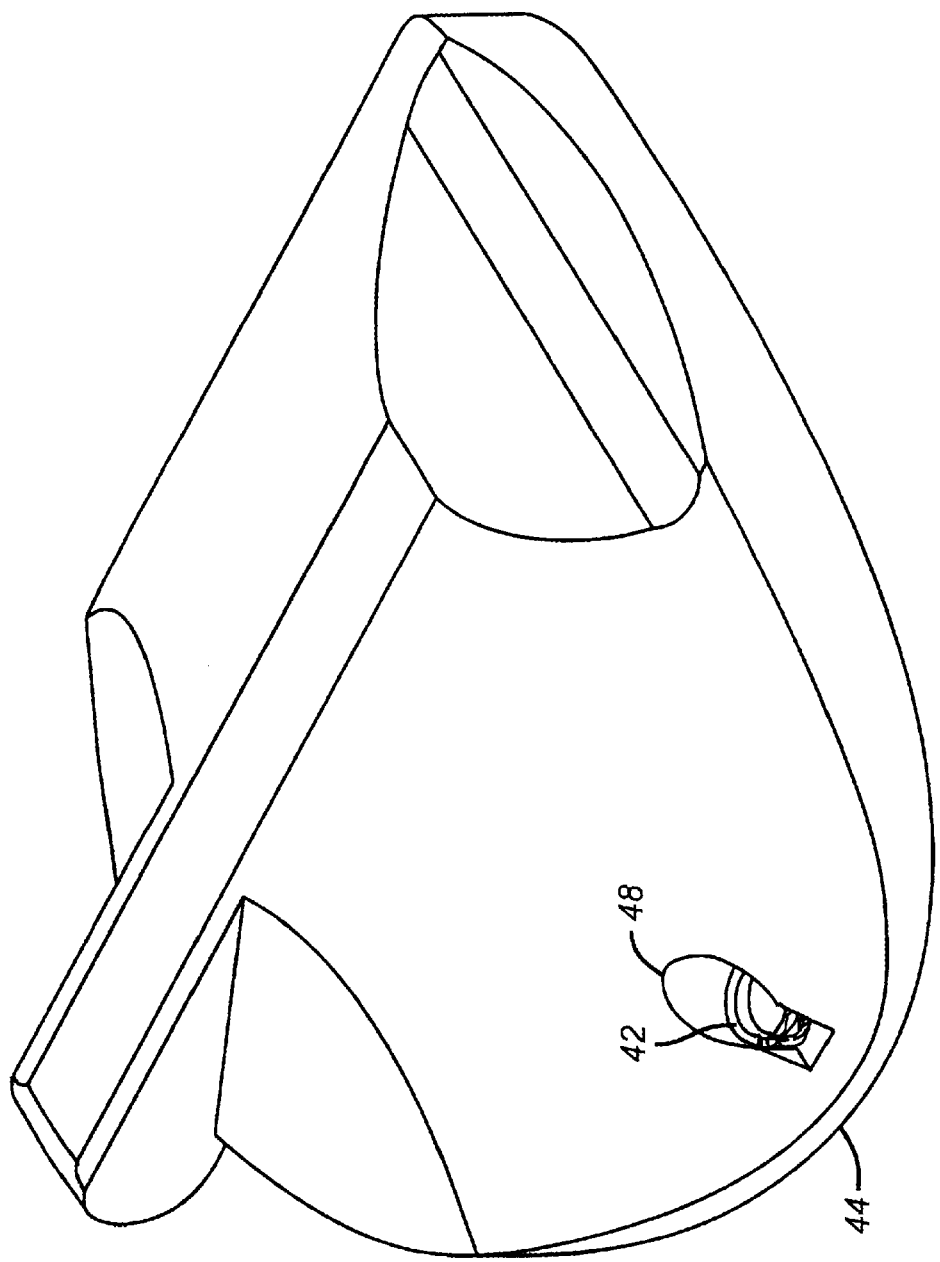
FIG. 2 is a perspective view of the equalizer valve of the present invention.
Figure 4:
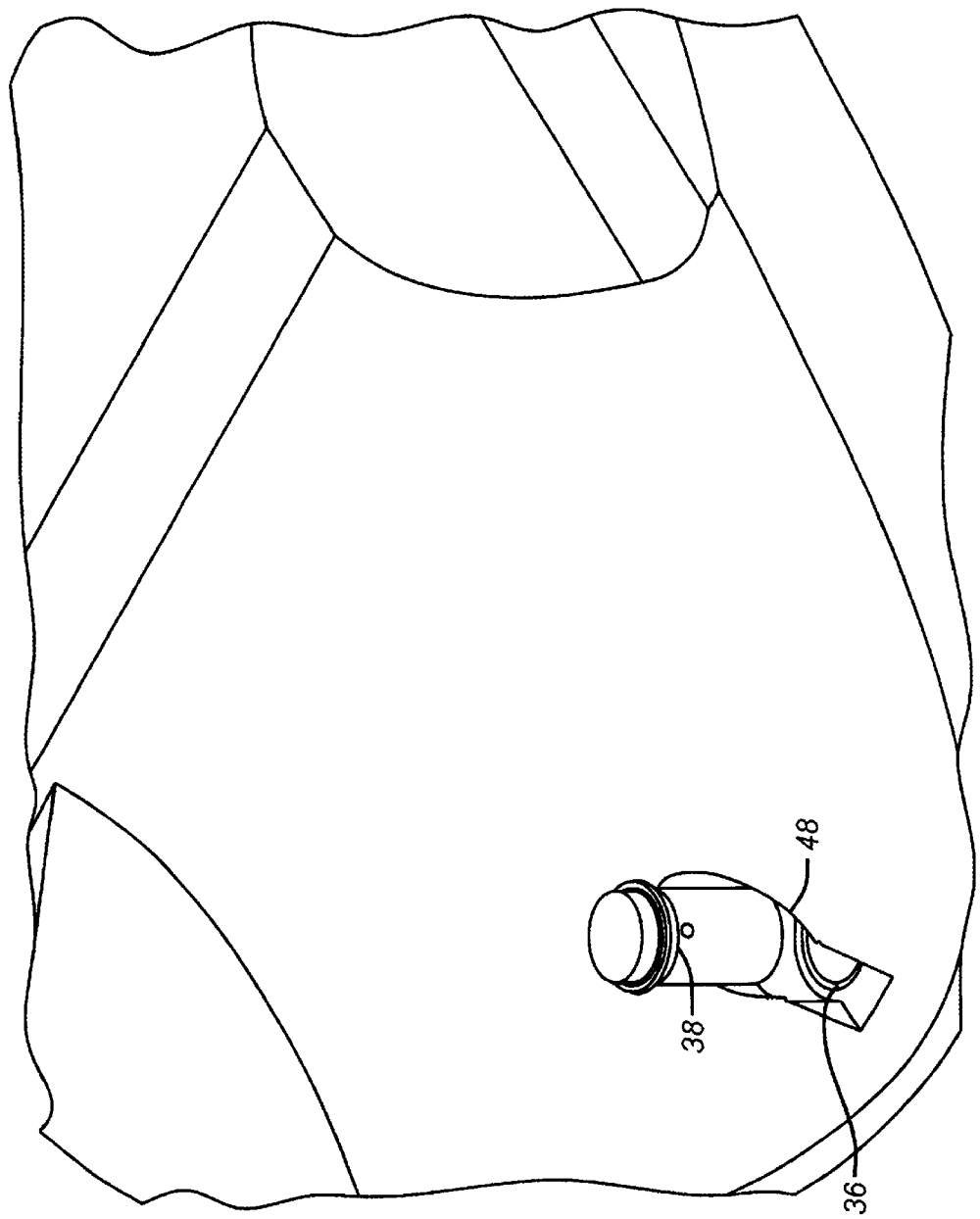
FIG. 4 is an exploded view of the equalizer valve of the present invention.

FIGS. 2 and 4 illustrate how much less metal needs to be removed to accommodate spring 40 than the prior art design depicted in FIG. 1. Very little material beyond the diameter of taper 38 on plunger 30 needs to be removed. A peripheral groove 46 is machined in bore 34 to accept a retainer, such as, the c-ring 42, as shown in FIG. 3. Spring 40, supported by c-ring 42 puts a closing force on plunger 30 by forcing its taper 38 against mill flat 36 in bore 34. This closing force is overcome by the flow tube force represented by arrow 32 such that equalizing across flapper 28 occurs before the flapper 28 is actually rotated by the flow tube itself.

Those skilled in the art will notice that the removed segment 48 out of flapper 28 is considerably smaller than the vertical segment 12 and undercuts 16 and 18 shown as removed from flapper 10. As a result, under extreme differential pressures there is no distortion in bore 34 which could cause leakage between mill flat 36 and taper 38.

Removed segment 48 may be slightly larger than bore 34 to facilitate the machining of groove 46 and the subsequent insertion of c-ring 42.

While spring 40 is preferably a wave spring other types of low profile biasing mechanisms are within the scope of the invention. Such alternatives can include coil springs or one or more Belleville washers. Yet other biasing systems that permit a minimization of the size of removed segment 48 are within the scope of the invention.

The above description of the preferred embodiment is illustrative and is not intended to be the full limits of the invention which is depicted in the claims which appear below.

I claim:

1. An equalizing system for a flapper in a well valve comprising:
   a flapper having a bore therethrough;
   a plunger, having a longitudinal axis and an outer periphery about said axis, and extending through said bore and biased into selective sealing contact therewith, said biasing accomplished by an annularly shaped biasing member disposed in a space defined between said bore and about said periphery of said plunger.

2. The system of claim 1, wherein:
said biasing member comprises at least one wave spring.

3. The system of claim 1, wherein:
said biasing member comprises at least one Bellville washer.

4. The system of claim 1, wherein:
said biasing member comprises at least one coiled spring.

5. An equalizing system for a flapper in a well valve comprising:
   a flapper having a cylindrical bore therethrough;
   a cylindrically shaped plunger, having a longitudinal axis and an outer periphery about said axis, and extending through said bore and biased into selective sealing contact therewith, a travel stop for said plunger disposed in an annular space in said bore defined between said outer periphery of said plunger and said bore.

6. The system of claim 5, further comprising:
at least one spring in said bore to create said bias.

7. The system of claim 6, wherein:
at least one wave spring in said bore to create said bias.

8. The system of claim 6, wherein:
at least one Bellville washer in said bore to create said bias.

9. The system of claim 6, wherein:
at least one coiled spring in said bore to create said bias.

10. The system of claim 6, wherein:
said spring is supported by said travel stop.

11. The system of claim 10, wherein:
said travel stop is disposed in a groove circumscribing said bore.

12. The system of claim 11, wherein:
said travel stop further comprises a snap ring.

13. An equalizing system for a flapper in a well valve comprising:
   a flapper having a cylindrical bore therethrough;
   a plunger, having a longitudinal axis and an outer cylindrical periphery about said axis, and extending through said bore and biased from within said bore into selective sealing contact therewith, said bore conforming to the shape of said periphery.

14. The system of claim 13, wherein:
said bias is applied within said bore.

15. The system of claim 14, wherein:
said plunger is retained by a retainer mounted in said bore.

16. The system of claim 15, wherein:
said bias is applied by at least one spring supported by said retainer.

17. The system of claim 16, wherein:
said spring comprises a wave spring.

18. The system of claim 13, wherein:
said plunger comprises a projection extending from said periphery for selective sealing in said bore, said projection, when pushed against said bias out of sealing contact, directs flow past said plunger radially, in a direction away from said longitudinal axis, to get around said projection.

19. The system of claim 16, wherein:
said retainer comprises a snap ring.

20. The system of claim 16, wherein:
said retainer is disposed in a groove surrounding said bore.

* * * * *